United States Patent
Stuempert et al.

(10) Patent No.: US 8,768,348 B2
(45) Date of Patent: Jul. 1, 2014

(54) METHOD AND DEVICE FOR PROVIDING A MOBILE STATION WITH NETWORK IDENTITY AND TIMEZONE (NTZ) INFORMATION

(75) Inventors: Martin Stuempert, Hochspeyer (DE); Joerg Christian Ewert, Erkelenz (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1768 days.

(21) Appl. No.: 11/718,493

(22) PCT Filed: Nov. 3, 2004

(86) PCT No.: PCT/EP2004/052767
§ 371 (c)(1),
(2), (4) Date: Dec. 16, 2008

(87) PCT Pub. No.: WO2006/048044
PCT Pub. Date: May 11, 2006

(65) Prior Publication Data
US 2009/0088179 A1    Apr. 2, 2009

(51) Int. Cl.
| | |
|---|---|
| H04W 8/02 | (2009.01) |
| H04W 4/02 | (2009.01) |
| H04W 4/00 | (2009.01) |
| G04B 19/22 | (2006.01) |
| G04B 47/02 | (2006.01) |

(52) U.S. Cl.
USPC ............. 455/432.1; 455/435.1; 455/456.1; 368/21; 368/4; 368/13

(58) Field of Classification Search
USPC ............ 455/456.1–456.7, 432.1–432.3, 455/435.1–435.3; 368/1–13, 21–27
See application file for complete search history.

(56) References Cited

U.S. PATENT DOCUMENTS

| | | | | |
|---|---|---|---|---|
| 5,255,307 | A | * | 10/1993 | Mizikovsky ............... 455/432.1 |
| 5,309,500 | A | * | 5/1994 | Koma et al. .................... 455/566 |
| 5,655,218 | A | * | 8/1997 | Smolinske .................... 455/566 |
| 5,790,952 | A | | 8/1998 | Seazholtz et al. |
| 5,818,920 | A | * | 10/1998 | Rignell et al. ............ 379/211.02 |
| 5,920,824 | A | * | 7/1999 | Beatty et al. .................. 455/425 |

(Continued)

FOREIGN PATENT DOCUMENTS

| | | |
|---|---|---|
| EP | 1 011 276 A | 6/2000 |
| GB | 2 395 092 A | 5/2004 |

(Continued)

OTHER PUBLICATIONS

3rd Generation Partnership Project; Technical Specification Group Services and System Aspects; Network Identity and Timezone (NITZ); Service Description, Stage 1 (Release 5) 3GPP TS 22.042 V5.1.0 (Jun. 2003).*

(Continued)

*Primary Examiner* — Matthew Sams

(57) ABSTRACT

The present invention relates to a method and a device—unit (11)—capable of performing the method for providing a mobile station (18) engaged with a telecommunications network (10) with data that is not identical throughout the whole network (10), where a table (27) is maintained in at least one unit (11) of the network (10) associating location dependent data (29) indicative of a location of the mobile station (18) to data that is valid for the mobile station (18).

18 Claims, 4 Drawing Sheets

(56) References Cited

U.S. PATENT DOCUMENTS

| | | | |
|---|---|---|---|
| 6,223,050 B1* | 4/2001 | Roberts, Jr. | 455/425 |
| 6,317,421 B1* | 11/2001 | Wilhelmsson et al. | 370/328 |
| 6,728,533 B2* | 4/2004 | Ishii | 455/425 |
| 6,759,960 B2* | 7/2004 | Stewart | 340/573.1 |
| 7,274,933 B2* | 9/2007 | Zinn et al. | 455/435.2 |
| 7,305,491 B2* | 12/2007 | Miller et al. | 709/248 |
| 7,697,935 B2* | 4/2010 | Guyot et al. | 455/443 |
| 7,821,875 B2* | 10/2010 | Punkka | 368/21 |
| 8,145,213 B2* | 3/2012 | Park | 455/434 |
| 2004/0203744 A1* | 10/2004 | Hicks et al. | 455/432.1 |
| 2004/0203848 A1* | 10/2004 | Kumar | 455/456.1 |
| 2005/0107083 A1* | 5/2005 | Rager et al. | 455/435.1 |
| 2005/0213566 A1* | 9/2005 | Jutila et al. | 370/352 |
| 2005/0254469 A1* | 11/2005 | Verma et al. | 370/338 |
| 2006/0002236 A1* | 1/2006 | Punkka | 368/21 |
| 2007/0140062 A1* | 6/2007 | Punkka | 368/21 |
| 2007/0217291 A1* | 9/2007 | Jeong et al. | 368/21 |
| 2007/0298795 A1* | 12/2007 | Zinn et al. | 455/435.1 |
| 2008/0247276 A1* | 10/2008 | Jeong et al. | 368/10 |
| 2010/0216439 A1* | 8/2010 | Marcelli et al. | 455/414.1 |

FOREIGN PATENT DOCUMENTS

| | | |
|---|---|---|
| JP | H07-203536 | 8/1995 |
| WO | WO 98/37721 A3 | 8/1998 |
| WO | WO 01/15479 A | 3/2001 |
| WO | WO 2004/064306 A3 | 7/2004 |

OTHER PUBLICATIONS

Digital Cellular Telecommunications System (Phase 2+); Universal Mobile Telecommunications System (UMTS); Network Identity and Time Zone (NITZ) service description; Stage 1 (3GPP TS 22.042 version 5.1.0 Release 5); ETSI TS 122 042: ETSI Standards, European Telecommunications Standards Institute, Sophia-Antipo, FR, vol. 3-SA1, No. V510, Jun. 2003, XP014007147 ISSN: 0000-0001 cited in the application *sections 1.4 and 6.1.

* cited by examiner

METHOD AND DEVICE FOR PROVIDING A MOBILE STATION WITH NETWORK IDENTITY AND TIMEZONE (NTZ) INFORMATION

FIELD OF THE INVENTION

The present invention relates to methods, use and devices for data transmissions over a telecommunications network by means of Network Identity and Timezone (NITZ) feature.

BACKGROUND OF THE INVENTION

In recent years cellular telephones have become increasingly popular. A cellular telephone is just one example of what is referred to in telephone parlance as a "mobile station" (MS) or "mobile terminal". A mobile station can take on various forms other than a cellular telephone, including a computer (e.g. a laptop computer) with mobile termination capabilities. A mobile station comprises of a so-called mobile equipment (ME) and a subscriber identification module (SIM).

Telecommunication services are provided between a cellular telecommunications network and a mobile station over an air interface, e.g. over radio frequencies. At any moment, an active mobile station is in communication over the air interface with one or more units of the communications network such as base transceiver stations (BTSs). Base transceiver stations (BTS) in turn are managed by other units of the network such base stations controllers (BSCs), also known as radio network controllers (RNCs). A base station controller (BSC) together with its base transceiver stations forms a base station subsystem (BSS). The base station controllers of a base station subsystem are connected via further units of the network, e.g. control nodes, to a core telecommunications network. Control nodes can take on various forms, depending on the types of services of networks to which the control nodes are connected. A well known embodiment of a control node is a mobile switching center (MSC), which is often associated with a visiting location register (VLR).

The network is described using GSM-type terminology. However, as is apparent to any person skilled in the art, the present invention may be employed in other radio communication networks, e.g. UMTS (Universal Mobile Telecommunications System), etc., as well. Therefore, the use of GSM-type terminology shall not be construed as limiting the scope of the invention. The mobile switching center in UMTS-type telecommunications networks is still denoted as mobile switching center (MSC). The equivalents of the base stations controller and the base transceiver station of GSM-type telecommunications networks however are denoted as radio network controller (RNC) and Node-B respectively in UMTS-type telecommunications networks.

An owner of a mobile station typically enters into a contract or subscription agreement with a service provider (e.g., a company which operates the telecommunications network through which the mobile station engages in telecommunications connections). As part of the subscription agreement, the mobile station is categorized as belonging to one of several access classes available on the network. Subscription data from the subscription agreement is stored in a record maintained e.g. in a home location register (HLR) for the mobile station. Each subscriber having a mobile station is assigned a unique International Mobile Subscriber Identity (IMSI). The international mobile subscriber identity is stored in the subscriber identification module.

A mobile subscriber, that is to say the user of the mobile station, who roams freely within the network, is able to do so because the network stores information about a location of the mobile station. This makes it possible for the mobile subscriber to receive a call regardless of location. To keep the network up to date with the subscriber's location, the mobile station informs the network whenever it changes a location area (LA). This is called location updating. Location areas (LAs) are defined by location area identities (LAI), comprising a mobile country code (MCC), a mobile network code (MNC) and a local area code (LAC).

A base transceiver station broadcasts a location area information to a mobile station. A base station controller/radio network controller broadcasts a routing area (RA) and the location area (LA) to the mobile station. The mobile station uses the received mobile network code (MNC) and compares the value with a mapping table, which is stored either in the mobile equipment (ME) or in the subscriber identification module (SIM). The mapping table translates the mobile network code (MNC) into a text string, which can be displayed on the display of the mobile equipment (ME). The text string comprises an alphanumeric representation of the network identity (NI), e.g. "T-D1", "$O_2$", etc.

The problem with this handling is that it is too static. Therefore there is no provision to account for changing names of the service providers or the actual branding for mobile stations (MS) on the market. Furthermore with communication networks jointly used by at least two service providers, the subscriber is likely to be displayed with a wrong network identity (NI), e.g. "D1" instead of "$O_2$" or vice-versa.

The 3GPP ($3^{rd}$ generation partnership project) specification TS 22.042—Network Identity and Time Zone (NITZ), Version 5.1.0 published Jun. 18, 2003, describes a mechanism to transfer a network identity (NI) within a mobility management (MM) message towards the mobile station (MS). However, even with NITZ it is not possible to send different network identities to subscribers of different service providers.

SUMMARY OF THE PRESENT INVENTION

Therefore, it is object of the present invention, to provide a method and devices that enables mobile stations to display the correct network identifier or similar information in varying circumstances.

This object is achieved by the independent claims.

The invention introduces a method for providing a mobile station engaged with a telecommunications network that comprises a core network, a first access network and a second access network with a Network Identity and Timezone information. The method comprises the steps of detecting that a Network Identity and Timezone information shall be send to a mobile station, determining a location of the mobile station, determining a Network Identity and Timezone information value depending on the location of the mobile station and on an information related to a telecommunications service provider providing a subscription used by the mobile station, and sending the Network Identity and Timezone information towards the mobile station.

In an embodiment of the invented method, a core network node maintains a table associating the information related to a telecommunications service provider to data that is used for determining the Network Identity and Timezone information-value.

The first access network can be associated to a first telecommunications service provider and the second access network can be associated to a second telecommunications service provider. In that case the information related to a telecommunications service provider can be an identification of a device of an access network that is used to serve the mobile station or an identification of a location area.

In and embodiment of the invention, the information related to a telecommunications service provider is an identification of the subscription.

The invention further introduces a use of Network and Timezone feature for transmitting information towards a mobile station. This is performed by replacing information that is usually sent in the Network Identity and Timezone information message by information that shall be transferred to the mobile station.

The invention further introduces a unit for a telecommunications network for providing a mobile station engaged with the telecommunications network, with a Network Identity and Timezone information value. Said network comprises a core network and at least two access networks, and the unit comprises an input unit, an output unit, a location determining unit, a calculation unit for calculating a Network Identity and Timezone information value and a control unit. The Unit further comprises an association unit for associating information related to a telecommunications service provider to data that is used for determining a Network Identity and Timezone value by the calculation unit.

The information related to a telecommunications service provider can be referring to a least one unit of an access network used for serving the mobile station.

The information related to a telecommunications service provider can be a location area identity.

The information related to a telecommunications service provider can also be an international mobile subscriber identity.

It is advantageous that the invented method enables the NITZ feature in shared networks and ensures the displaying of the appropriate network identifier.

Further advantageous is the maintenance of a table in a core network node. Locating the table in the core network has the advantage that the table is centralised.

To identify a network by means of a device of an access network has the advantage that network identification is more reliable, as it is oriented at facts instead of settings.

To identify the network by means of a location area has the advantage that the sending of a NITZ at a location area update can be implemented in a very simple way.

The identification of a network to be displayed by means of an identification of a subscription enables to display an identification of a network of the service provider providing the subscription even in an access network of a different operator.

The use of the NITZ feature message as a container for information in general has the advantage that a further mechanism for sending information to be displayed to a subscriber is available.

The invention is based on realising that the network stores information where a mobile station is located when attached to the network. This information comprises for example data referring to the unit (the units) participating in the attachment of the mobile station to the network or data referring to locations covered by units of the network by means of the range of the radio transmission. The invention therefore proposes to use the location related data to select and transfer respective data which is not identical throughout the whole network, as is true for the network identity in a shared network, but is valid for the area indicated by the location related data. An example for data which is not identical throughout the whole network is local time information in a network covering more than one local time zones.

The essential advantage of the invention is that each mobile station receives data, which is valid and correct for that certain mobile station and/or location.

The invention as it is defined by the appending claims also involves, for networks comprising of a core network and a radio network, the transmission of the data which is valid for the mobile station via at least one unit of the radio network. The transmitted data can for example be selected from a table provided at a unit of the core network.

The invention can also involve, for networks comprising a core network and a radio network, the transmission of the data which is valid for the mobile station by overwriting data which is not valid for the mobile station and which was sent from a unit of the core network, while the data which is valid for the mobile station is selected from a table provided at a unit of the radio network.

Obviously, other selection and/or transfer arrangements can be envisaged.

BRIEF DESCRIPTION OF THE DRAWINGS

All the elements which are not required for the immediate understanding of the invention are omitted. In the drawing, the same elements are provided with the same reference numerals in the various figures, and in which:

FIG. 1 shows an example cellular telecommunications network 10. The network 10 comprises of a mobile switching center (MSC) 11, connected to one or more base station controllers (BSC) 12, 13. The base station controllers 12, 13 in turn are each connected to one or more base transceiver stations (BTS) 14, 15, 16, 17. Each base transceiver station 14-17 builds an air interface to mobile station (MS) 18, 19. The mobile switching center 11 as well as one or several base station controllers 12, 13 represent the core network of the telecommunications network 10. The one or more base transceiver stations 14-17 as well as any mobile station 18, 19 attached to the telecommunications network constitute the radio network of the telecommunications network 10.

Figure 1:
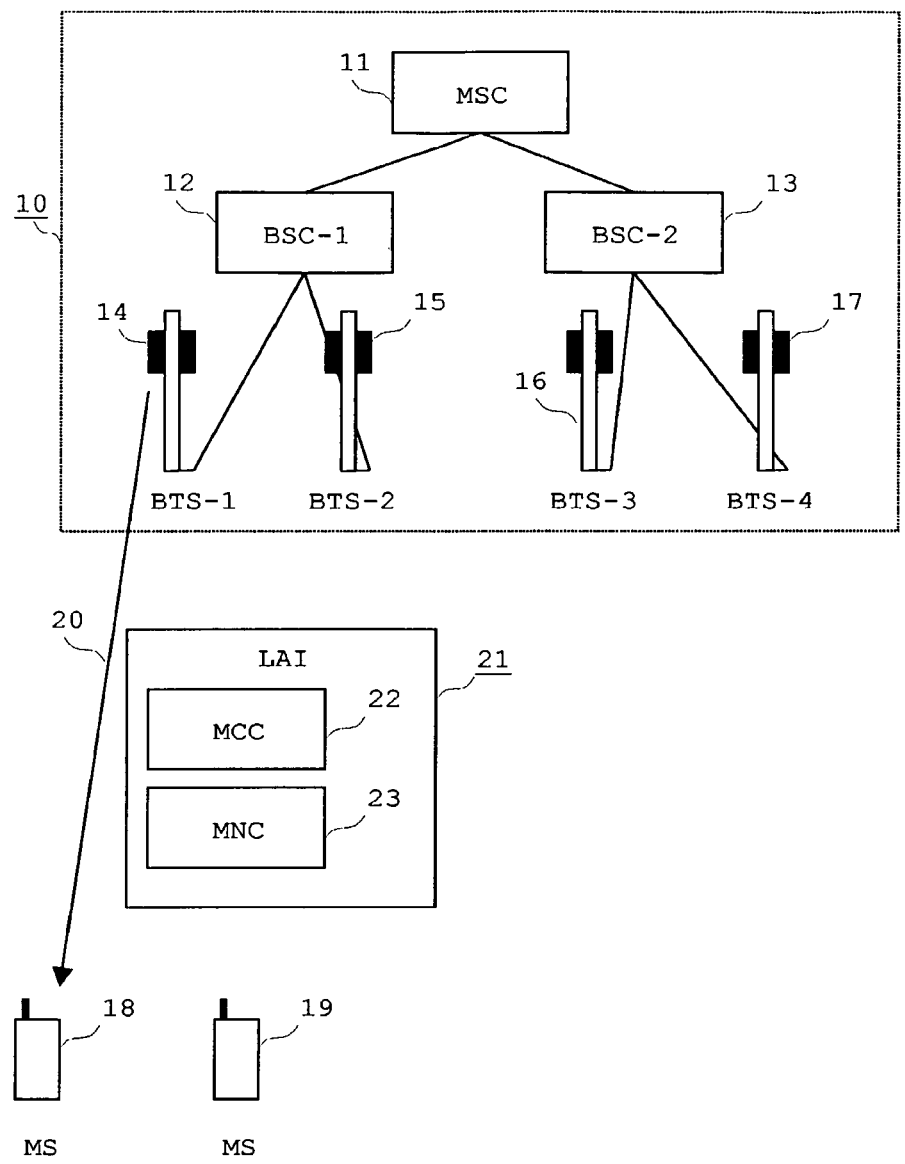
FIG. 1 is a schematic view of a cellular telecommunications network.

The network 10 depicted in FIG. 1 is shown using GSM-type terminology. While the preferred implementation is described in the GSM context/application, the present invention may be employed in other radio communication networks, e.g. UMTS. The same applies for the following figures as well.

A base transceiver station 14-17 broadcasts (broadcast 20) a local area information (LAI) 21 including a mobile country code (MCC) 22 and a mobile network code (MNC) 23 to the mobile stations 18, 19 engaged with the particular base transceiver station 14. The mobile network code (MNC) 23 actually sent to the mobile station 18 is a special mobile network code, e.g. MNC-2, according to the base station controller (BSC) 12, 13/base transceiver station (BTS) 14-17 broadcasting the local area information (LAI) 21.

On receiving the local area information 21 the mobile stations 18, 19 compare the received data, i.e. MNC-2, MCC, with mobile network codes and mobile country codes (MNC, MCC) stored in a table in the subscriber identification module (SIM). The stored collection of MNC, MCC data for example comprises of the following exemplary entries:

MCC, MNC-1→"O2"
MCC, MNC-2→"D1"
MCC, MNC-x→ . . . .
. . .

Therefore, both the mobile stations 18, 19 on receiving the local area information (LAI) 21 including the mobile network code MNC-2 will display the text string "T-D1" as the network identity on their displays. Thus, both the mobile stations 18, 19 display the same network identity even if they belong to different service providers. This is erroneous.

Figure 2:
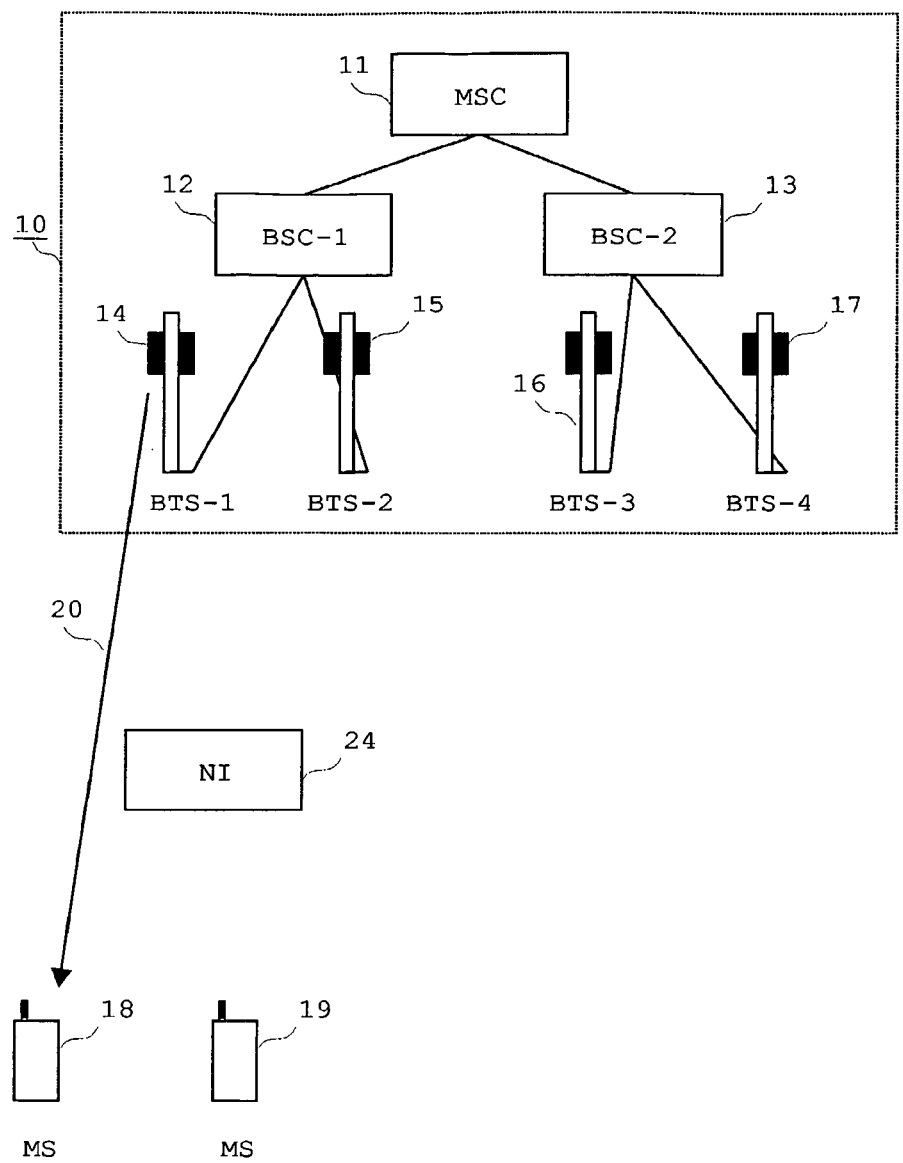
FIG. 2 is a schematic view of the cellular telecommunications network with a special data transmission and FIG. 3 is a block diagram of some units of a telecommunications network engaged in data transmission.

FIG. 2 again shows an example cellular telecommunications network 10 as described beforehand in connection with FIG. 1. The difference between FIG. 1 and FIG. 2 is that the telecommunications network 10 broadcasts (broadcast 20) the network identity (NI) 24 using the NITZ feature. NITZ is, unlike the "classical approach" as illustrated in FIG. 1, not based on text strings stored in the mobile station 18, 19. With NITZ the text strings are directly transmitted to the mobile station 18, 19. This makes it possible for a serving telecommunications network 10 to transfer its current identity 24 to mobile stations 18, 19 and for the mobile station 18, 19 to store and use this information. This enables the accurate indication of network identities that are either newer than the mobile station 18, 19, i.e. the data stored in the mobile station 18, 19, or have changed since the mobile station 18, 19 was manufactured or sold.

However, NITZ only allows one text string to be transmitted as network identity. Thus, with telecommunication networks 10 shared by at least two service providers all the mobile stations 18, 19 attached at the network 10 will display the same network identity when using NITZ. This is a shortcoming the invention tends to overcome.

Figure 3:
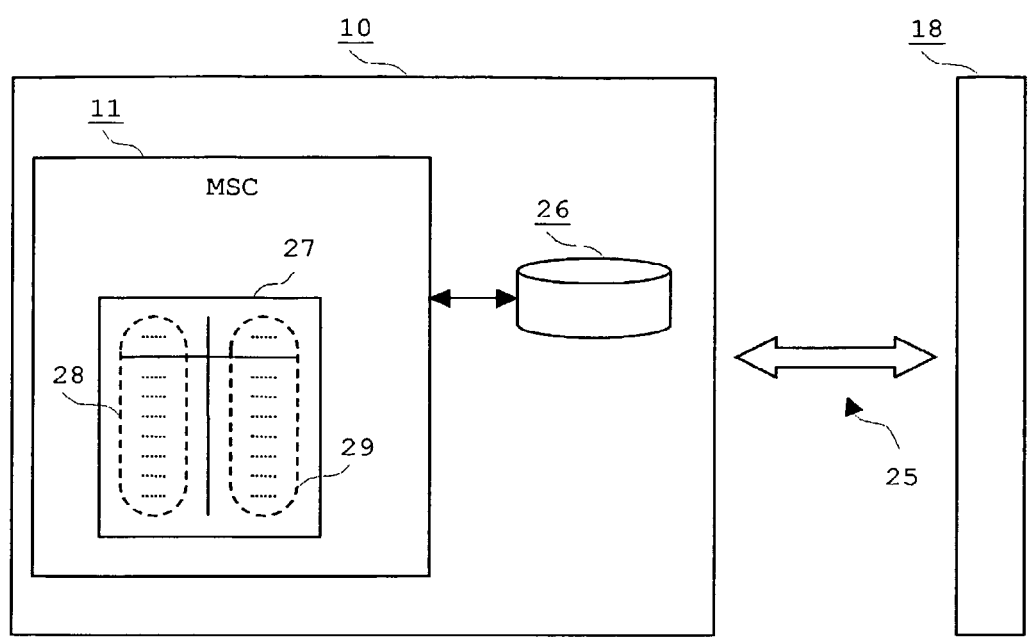

The invention therefore provides the possibility to send different network identities 24 to mobile stations 18, 19 attached to the same network 10. A selection of the network identity 24 actually sent to a certain mobile station 18 is based on the location of that mobile station 18. To do so, data sent either by a mobile station 18 itself or on behalf of the mobile station 18 and comprising of data indicating the location of that mobile station 18 is analyzed by the network. The data sent by the mobile station 18 or on behalf of the mobile station 18 for example is data transmitted in connection with the so-called mobility management (MM) as shown in FIG. 3.

Mobility management is concerned with all aspects of the mobility as well as identification and authentication of the subscriber. The underlying protocol enables transmission of mobility related data 25 between the mobile station 18 and the network 10, that is to say the core network, especially the mobile switching center 11. Mobility related data 25 is exchanged between a mobile station 18 and the network 10 when doing a location update. For updating the location of a subscriber a location area (LA) is stored in the visiting location register (VLR) 26, which is preferably associated with the mobile switching center 11. Additionally an identifier referring to the base station controller 12, 13 from which the location updating has been received is stored either in the visiting location register 26 and/or the mobile switching center 11.

Therefore an association unit, for example implemented by means of a table 27, is maintained in the mobile switching center 11 associating different network identities 28 to one or more location dependent entries 29. In a preferred embodiment a location dependent entry 29 is referring to one or more elements of the core network. Therefore a certain table 27 according to the preferred embodiment is associating different network identities 28 to one or more base station controllers 12, 13 as subsequently depicted in an exemplary manner:

BSC-1→"Network Identity 1"
BSC-2→"Network Identity 1"
BSC-3→"Network Identity 2"
BSC-4→"Network Identity 2"
. . .

Thus, the network 10 is enabled to send a network identity to the mobile station 18 based on the elements 29 of the network 10 participating in the mobility management of the mobile station 18. If, for example, a certain base station controller 12 is involved in transferring the mobility related data 25 within the network 10, the mobile station 18 is expected to be located within an area covered by that base station controller 12 as well as to be attached to the network 10 via that base station controller 12. Therefore, if the network 10 is shared in a manner that a first base station controller 12 is operated by a first provider and a second base station controller 13 is operated by a second provider each using different network identities, the network 10 is able to send the respective provider's network identity to the mobile station 18 with regard to the location of the mobile station 18 which is derived from the elements participating in the mobility management of the mobile station 18.

In case that the operators only have the air interface separated, i.e. the base station transceivers 14-18, the network identification is based on the location area (LA) or on a base station area (BSA). The location area (LA) is an area served by one or more base transceiver stations 14-17 and a base station area (BSA) is an area served by just one base transceiver station 14-17.

The table 27 maintained in the mobile switching center 11 accordingly has the following form associating different network identities 28 to location dependent entries 29, where a location dependent entry 29 either refers to a location area (LA) or a base station area (BSA):

LA-1, LA-2, . . . LA-100→"Network Identity 1"
LA-101, LA-102, . . . LA-200→"Network Identity 2"
or
BSA-1, BSA-2, . . . BSA-100→"Network Identity 1"
BSA-101, BSA-102, . . . BSA-200→"Network Identity 2"

The analysis of the table 27 when containing data relating to location areas or base station areas is similar to that of the table containing data referring to the base station controllers 12, 13 involved as described beforehand.

Accordingly it can be said, that the table 27 maintained in the mobile switching center 11 is of the general form where an entry, i.e. the network identity 28, is associated with a set of location dependent data 29. The location dependent data 29 is either an identifier referring to the base station controller 12, 13 used when attaching with the network 10 or an identifier referring to the location area/base station area where the mobile station 18 is located or any other data indicating the location of the mobile station 18.

In an alternative embodiment of the invention the association unit implemented for example by means of a table as described beforehand may be maintained in other units of the telecommunications network 10, i.e. either in the base station controller 12, 13 or in the base transceiver station 14-17. Depending on which unit of the network 10 maintains the table, said unit, e.g. the base station controller 12, 13 or the base transceiver station 14-17, overwrites (patches) the network identity sent from the mobile switching center 11 according to the contents of the table if needed. If, for example, in a shared network one base station controller 12 is solely operated by one provider that base station controller 12 would overwrite any network identity sent from the mobile switching center 11 with the network identity of that provider.

According to another embodiment of the invention the network 10, e.g. a mobile station controller 11, is provided to send all possible network identity strings to another unit of the network, i.e. the base station controller 12, 13 or the base transceiver station 14-17. The addressed unit 12, 13; 14-17 will store all received network identity data in a mapping table associating each network identity with at least one mobile network code (MNC). When processing a location update with a mobile station 18 the unit 12, 13; 14-17 will check the table for the mobile network code MNC and will transfer the associated network identity to the mobile station 18.

The approach as described beforehand may as well be employed to transfer local time data to mobile stations 18, 19. So far there is only a transfer of a single time information for an entire telecommunications network 10. If a telecommunications network 10 extends over more than one time zone this will lead to incorrect time information at mobile stations 18, 19 roaming in a different time zone compared to the time zone where the unit of the network 10 broadcasting the time data, e.g. the mobile switching center 11, is located.

To overcome this deficiency the invention provides a table associating location dependent data 29 with local time data. For example the table may comprise data as follows, where GMT is the abbreviation of Greenwich Mean Time and 1 h means one hour:

BSC-1→GMT-1 h
BSC-2→GMT
BSC-3→GMT+1 h
BSC-4→GMT+1 h
. . .

According to the other embodiments of the invention the table may as well contain location dependent data 29 referring to location areas (LA) or a base station areas (BSA):

LA-1, LA-2, . . . LA-100→GMT-1 h
LA-101, LA-102, . . . LA-200→GMT or

BSA-1, BSA-2, BSA-100→GMT-1 h
BSA-101, BSA-102, . . . BSA-200→GMT

In a further preferred embodiment the table may contain local time data as well as network identities 28. A mapping table like this will associate location dependent data 29 to both a respective network identity as well as the respective local time data.

According to still another embodiment of the invention the table 27 comprises no location dependent data 29 but data identifying the mobile station 18, 19 itself. An example for such data identifying the mobile station 18, 19 is the International Mobile Subscriber Identity (IMSI) transferred between the network 10 and the mobile station 18 as shown in FIG. 3 when considering the transfer of mobility related data 25. The IMSI is analyzed at least at the mobile switching center 11 to ensure the authorization of the mobile station 18 to attach to the network. Each provider knows the IMSI of their subscribers. Therefore a table similar to the table 27 described beforehand may be set up comprising all the IMSIs of all the subscribers and associating each IMSI with a network identity. When transferring the network identity to the mobile station 18 of the subscriber the table is searched for the subscriber's IMSI and the respective network identity is transferred to the subscriber. If the number of subscribers exceeds certain thresholds it may be inappropriate to provide a table comprising distinct entries for every IMSI. Instead the table may comprise of data suitable for a logical operation, as for example a logical AND-operation, to associate a set of IMSIs with identical significant elements to a certain network identity. The subsequent list illustrates the contents of such table:

IMSI-1, IMSI-2, . . . IMSI-100→"Network Identity 1"
IMSI-101, IMSI-102, . . . IMSI-200→"Network Identity 2"

Although a preferred embodiment of the invention has been illustrated and described herein, it is recognized that changes and variations may be made without departing from the invention as set forth in the claims.

In a further embodiment of the invention, information shall be transported to a mobile station that is not one of Network identity or Timezone information. This enables to send any information to a mobile station.

Figure 4:
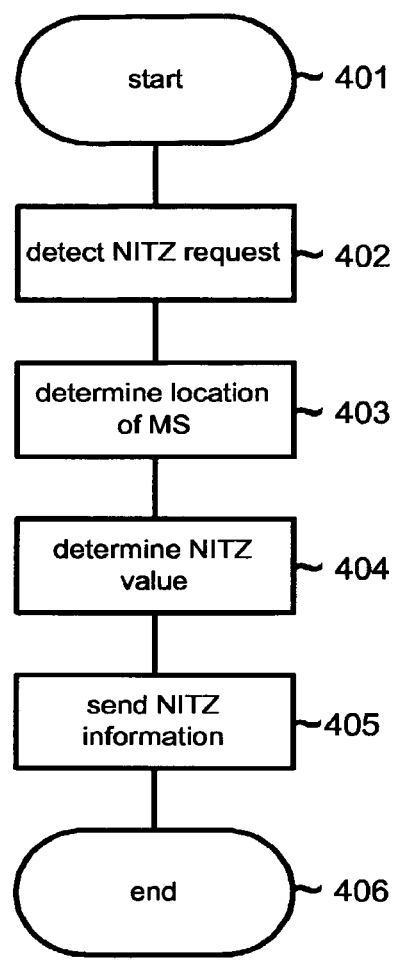
FIG. 4 depicts a flow chart of the method according to the invention.

FIG. 4 depicts a flow diagram of a method according to the invention. In a first step 401 of the method, it is started. In a succeeding step 402 it is detected that NITZ information is requested. This detection can be for example by detecting that a NITZ trigger event has occurred, for example by receiving an appropriate message. A NITZ trigger event can be for example the registering of a mobile station on the network, when a mobile station geographically relocates to a different Local Time Zone, when the network changes its Local Time Zone, e.g. between summer and winter time, when the network changes its identity, or at any time during a signalling connection with mobile station. A NITZ trigger event may also be the detection of the necessity to send information to the mobile station, for example a request to activate or deactivate a functionality, or to indicate that service parameter like price or bandwidth for a service changed.

In a next step 403 a location of the mobile station is determined. This can be performed by means of a location area identity or an identification of a device currently serving the mobile station.

In a further step 404 a NITZ value is determined, preferably depending on the determined location of the mobile station.

In a succeeding step 405 the NITZ information is sent to the mobile station and the method ends in a step 406.

Figure 5:
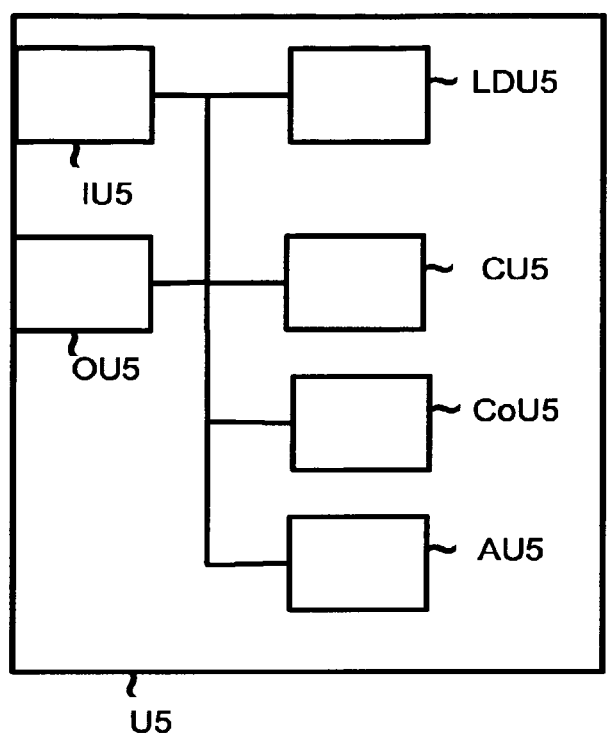
FIG. 5 depicts a unit according to the invention.

FIG. 5 depicts a unit U5 according to the invention. The unit comprises an input unit IU5 for receiving messages, an output unit OU5 for sending messages, a location determining unit LDU5 for determining a location of a mobile station, a calculation unit CU5 for calculating a NITZ value, a control unit CoU5 for coordinating and controlling the other units in a way that they implement an invented method and a association unit AU5 for associating information related to a telecommunications service provider to data that is used for determining the NITZ value. Examples for information related to a telecommunications service provider are, an identification of a device used for serving a mobile station, a location area identification, or an identification of a subscription used in the mobile station.

The units may be implemented by means of software, e.g. a software module, by means of hardware or a combination of both. The units are not necessarily located within a single unit or housing, but should be connected to each other for interworking.

REFERENCE SIGNS 10 telecommunications network
11 mobile switching center
12 base stations controller
13 base stations controller
14 base transceiver station
15 base transceiver station
16 base transceiver station
17 base transceiver station 18 mobile station
19 mobile station
20 broadcast
21 local area information
22 mobile country code
23 mobile network code
24 network identity
25 mobility related data
26 visiting location register
27 table
28 network identity/set of network identities
29 location dependent data/location dependent entries

The invention claimed is:

1. A method in a core network node for providing a mobile station engaged with a telecommunications network in a shared environment via an access network of a first provider with Network Identity Information of another provider, the method comprising:
 detecting, by the core network node, that Network Identity information shall be sent to the mobile station, the mobile station being associated with the another provider,
 determining, by the core network node, a location of the mobile station,
 determining, by the core network node, the Network Identity information of the another provider associated to the mobile station depending on the location of the mobile station, where the determined Network Identity information is from among a plurality of Network Identify information used in the shared environment other than Network Identity information of the first provider, and
 sending, by the core network node, the determined Network Identity information towards the mobile station.

2. The method according to claim 1, wherein the core network node maintains a table associating information related to a provider to data that is used for determining the Network Identity information.

3. The method according to claim 2, wherein the information related to the provider is an identification of a device of an access network that is used to serve the mobile station.

4. The method according to claim 2, wherein the information related to the provider is an identification of a location area.

5. The method according to claim 2, wherein the information related to provider is an identification of the subscription.

6. The method according to claim 1, wherein the core network node is a mobile switching center.

7. A method in a core network node for providing a mobile station engaged with a telecommunications network in a shared environment via an access network of a first provider with Network Identity information of another provider, the method comprising:
 detecting, by the core network node, that Network Identity information shall be sent to the mobile station, the mobile station being associated with the another provider,
 identifying, by the core network node, an identity of the mobile station,
 determining, by the core network node, depending on the identity of the mobile station, the Network Identity information of the another provider associated with the mobile station from among a plurality of Network Identify information used in the shared environment other than Network Identity information of the first provider, and
 sending, by the core network node, the determined Network Identity information towards the mobile station.

8. The method according to claim 7, wherein the core network node is a mobile switching center.

9. A method of transmitting information towards a mobile station utilizing Network and Timezone information (NITZ), the method implemented in a control network node comprising:
 replacing, by the core network node, information normally sent in the NITZ message with information selected from the group comprising:
 name of a telecommunications service provider not being the one actually serving the mobile station, actual branding for the mobile station, or an identification of a subscription to be transferred to the mobile station; and
 transmitting, by the core network node, the selected information to the mobile station.

10. A hardware unit in a telecommunications network for providing a mobile station, engaged with the telecommunications network in a shared environment via an access network of a first provider, with a Network Identity information of another provider, wherein the hardware unit comprises:
 an input unit, an output unit, a location determining unit, a calculation unit for calculating the Network Identity information, and a control unit, the control unit comprising:
 an association unit for associating information related to a telecommunications service provider to data that is used for determining the Network Identify information by the calculation unit, the data being selected from the group comprising:
 name of the telecommunications service provider not being the one actually serving the mobile station, actual branding for the mobile station, or an identification of a subscription to be transferred to the mobile station; and
 the output unit for sending the Network Identity information to the mobile station.

11. The hardware unit according to claim 10, wherein the information related to a telecommunications service provider is referring to a least one unit of an access network used for serving the mobile station.

12. The hardware unit according to claim 10, wherein the information related to a telecommunications service provider is a location area identity.

13. The hardware unit according to claim 10, wherein said information related to a telecommunications service provider is an international mobile subscriber identity.

14. A method for providing a mobile station engaged with a telecommunications network that comprises a mobile switching center, a core network, a first access network, and a second access network with a Network Identity and Timezone information, the method implemented by the mobile switching center comprising:
 detecting, by the mobile switching center, that the Network Identity and Timezone information shall be sent to the mobile station, where the mobile station is engaged with the mobile switching center that extends over more than one time zone, and where the mobile station is engaged with the first access network of the telecommunications network,
 determining, by the mobile switching center, a location of the mobile station,
 determining, by the mobile switching center, the Network Identity and Timezone information depending on the location of the mobile station and on information related to a telecommunications service provider providing a subscription used by the mobile station, where the telecommunications service provider providing the subscription used by the mobile station is different than a telecommunications service provider associated with the first access network, and sending, by the mobile switching center, the determined Network Identity and Timezone information towards the mobile station.

15. The method according to claim 14, wherein the mobile switching center maintains a table associating Network Identities to data that is used for determining the Network Identity information.

16. The method according to claim 15, wherein the data for determining the Network Identity information and identifying the mobile station is an International Mobile Subscriber Identity (IMSI) of the mobile station.

17. The method according to claim 15, wherein the table comprise data suitable for a logical operation to associate a set of International Mobile Subscriber Identities (IMSIs) with identical significant elements to a certain network identity, wherein IMSIs are used to identify a mobile station.

18. The method according to claim 14, wherein the mobile switching center is located in a different time zone than the mobile station.

* * * * *

UNITED STATES PATENT AND TRADEMARK OFFICE
CERTIFICATE OF CORRECTION

| | | |
|---|---|---|
| PATENT NO. | : 8,768,348 B2 | Page 1 of 1 |
| APPLICATION NO. | : 11/718493 | |
| DATED | : July 1, 2014 | |
| INVENTOR(S) | : Stuempert et al. | |

It is certified that error appears in the above-identified patent and that said Letters Patent is hereby corrected as shown below:

In the Drawings

In Fig. 1, Sheet 1 of 4, delete "FIG" and insert -- FIG. --, therefor at each occurrence throughout the figures (Figs. 1-3).

In the Specification

In Column 3, Line 27, delete "a least" and insert -- at least --, therefor.

In Column 4, Line 28, delete "network;" and insert -- network, --, therefor.

In Column 4, Line 30, delete "transmission and" and insert -- transmission, --, therefor.

In Column 4, Line 36, insert heading as -- DETAILED DESCRIPTION --, therefor.

In Column 5, Line 4, delete ""D1"" and insert -- "T-D1" --, therefor.

In Column 5, Line 22, delete "current identity 24" and insert -- current network identity 24 --, therefor.

In the Claims

In Column 9, Line 29, in Claim 1, delete "Identify" and insert -- identity --, therefor.

In Column 9, Lines 62-63, in Claim 7, delete "Identify" and insert -- identity --, therefor.

In Column 10, Line 27, in Claim 10, delete "Identify" and insert -- identity --, therefor.

In Column 10, Line 38, in Claim 11, delete "a least" and insert -- at least --, therefor.

Signed and Sealed this
Twentieth Day of August, 2019

Andrei Iancu
*Director of the United States Patent and Trademark Office*